(12) United States Patent
Bogin et al.

(10) Patent No.: US 6,215,703 B1
(45) Date of Patent: *Apr. 10, 2001

(54) IN ORDER QUEUE INACTIVITY TIMER TO IMPROVE DRAM ARBITER OPERATION

(75) Inventors: Zohar Bogin, Folsom; Vincent Von Bokern, Rescue, both of CA (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/205,504

(22) Filed: Dec. 4, 1998

(51) Int. Cl.[7] .................................................. G11C 7/00
(52) U.S. Cl. .............................. 365/185.33; 365/230.08; 365/233
(58) Field of Search ............................. 365/233, 189.05, 365/230.08

(56) References Cited

U.S. PATENT DOCUMENTS 5,621,698 * 4/1997 Lee ....................................... 365/233
6,052,328 * 4/2000 Ternullo, Jr. et al. ................ 365/233

* cited by examiner

Primary Examiner—Terrell W. Fears
(74) Attorney, Agent, or Firm—Blakely, Sokoloff, Taylor & Zafman LLP

(57) ABSTRACT

According to one embodiment, the present invention discloses a method of accessing a memory in a computer system. The method includes granting access of the memory to a first agent after arbitration. Next, the first agent relinquishes control of the memory. Subsequently, a request is received from a second agent during arbitration to access the memory. It is next determined whether the second agent has a higher priority request classification than the first agent. If the second agent does not have a higher priority request classification than the first agent, it is determined whether a predetermined time interval has elapsed since the first agent relinquished control of the memory. If the predetermined time interval has not elapsed, access of the memory is withheld from the second agent.

According to a further embodiment, access to the memory is granted if it is determined that the predetermined time interval has elapsed. Additionally, if the predetermined time interval has not elapsed, it is determining whether the first agent has requested to regain access to the memory. If the first agent has requested to regain access to the memory, access to the memory is granted to the first agent.

30 Claims, 4 Drawing Sheets

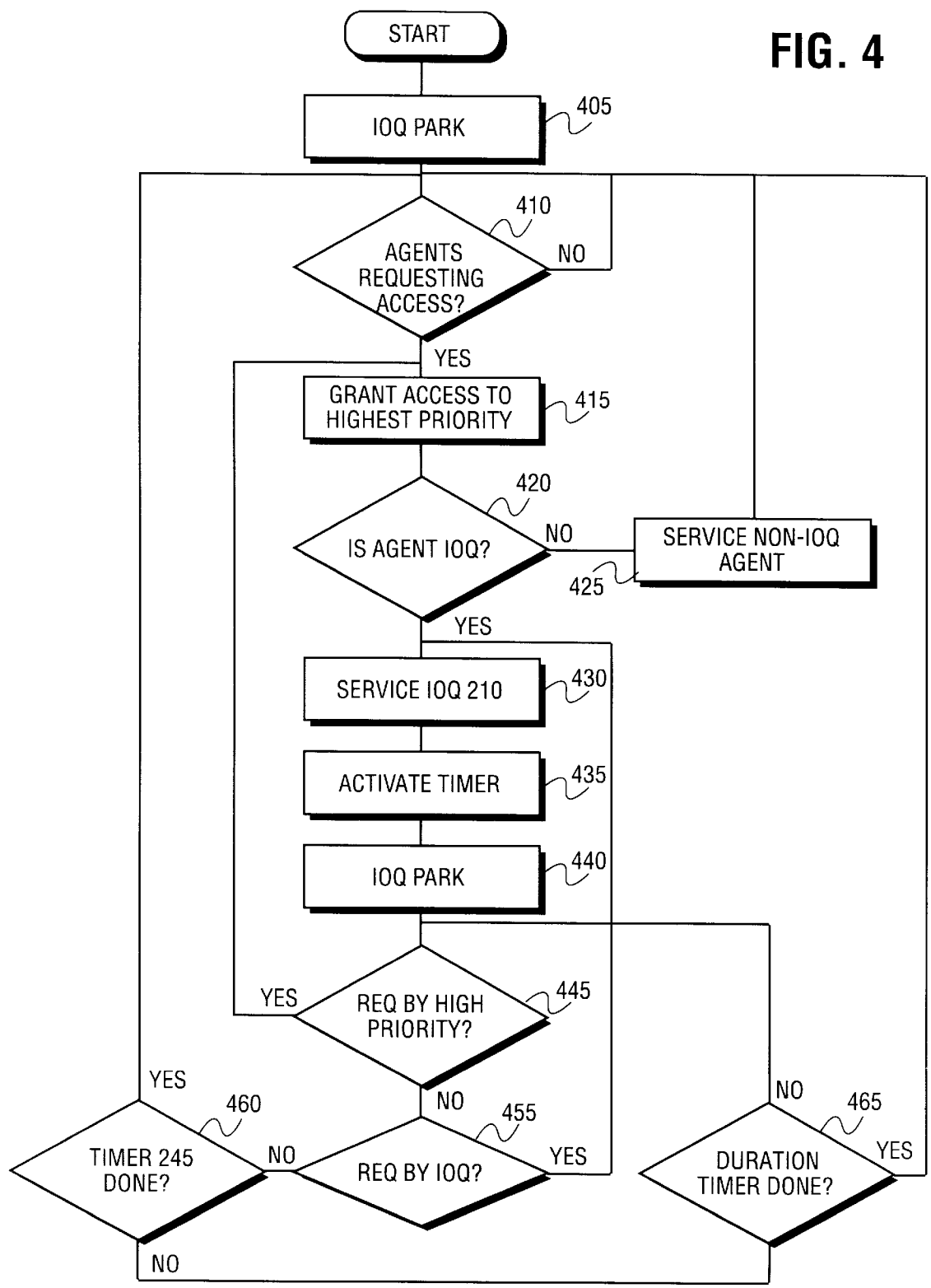

IN ORDER QUEUE INACTIVITY TIMER TO IMPROVE DRAM ARBITER OPERATION

FIELD OF THE INVENTION

The present invention relates to memory systems; more particularly, the present invention relates to arbitration between multiple agents in order to gain control of a memory system.

BACKGROUND OF THE INVENTION

For many years, electronic systems (e.g., networks, computer systems, printers, etc.) have been designed to allow multiple agents access to a single resource such as an interconnect bus or memory. These agents usually issue requests to gain exclusive access to the resource for a predetermined period of time. Typically, an arbitration circuit is required to arbitrate access to the resource between multiple requesting agents (i.e., agents simultaneously requesting access to the resource). After one of the requesting agents gains access to the resource, it performs a particular operation and relinquishes access of the resource upon completion of the particular operation or expiration of the predetermined time period, whichever occurs first.

In a computer system multiple agents typically arbitrate to gain access to the main memory. Memory traffic originated by a particular agent tends to be concentrated in one or more localized regions of the memory over a short period of time. Also, in the case of microprocessors (or processors), a significant fraction of processor requests are issued within a predetermined number of clock cycles as a previous processor request. Permitting the processor to immediately regain access to the memory would likely result in the subsequent processor request accessing the same page of memory as the previous processor request. Consequently, the overall access time of the memory by the processor would be substantially reduced.

However, in typical computer systems the arbiter grants access to another agent immediately after the memory has completed servicing the processor and the processor has no requests pending. Thus, the subsequent agent closes the page of memory in which the processor had accessed. Upon the processor regaining access to the memory, the previously closed page must be reopened before the memory may service the processor. This results in the increase of the amount of time that is necessary for the processor to access the memory. Accordingly, it would be desirable to provide an efficient method of selection of an agent by an arbiter in order to gain access to a memory.

SUMMARY OF THE INVENTION

According to one embodiment, the present invention discloses a method of accessing a memory in a computer system. The method includes granting access of the memory to a first agent after arbitration. Next, the first agent relinquishes control of the memory. Subsequently, a request is received from a second agent during arbitration to access the memory. It is next determined whether the second agent has a higher priority request classification than the first agent. If the second agent does not have a higher priority request classification than the first agent, it is determined whether a predetermined time interval has elapsed since the first agent relinquished control of the memory. If the predetermined time interval has not elapsed, access of the memory is withheld from the second agent.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

FIG. 4 is a flow diagram of the operation of an arbiter in accordance with one embodiment of the present invention.

DETAILED DESCRIPTION OF THE PRESENT INVENTION

Figure 1:
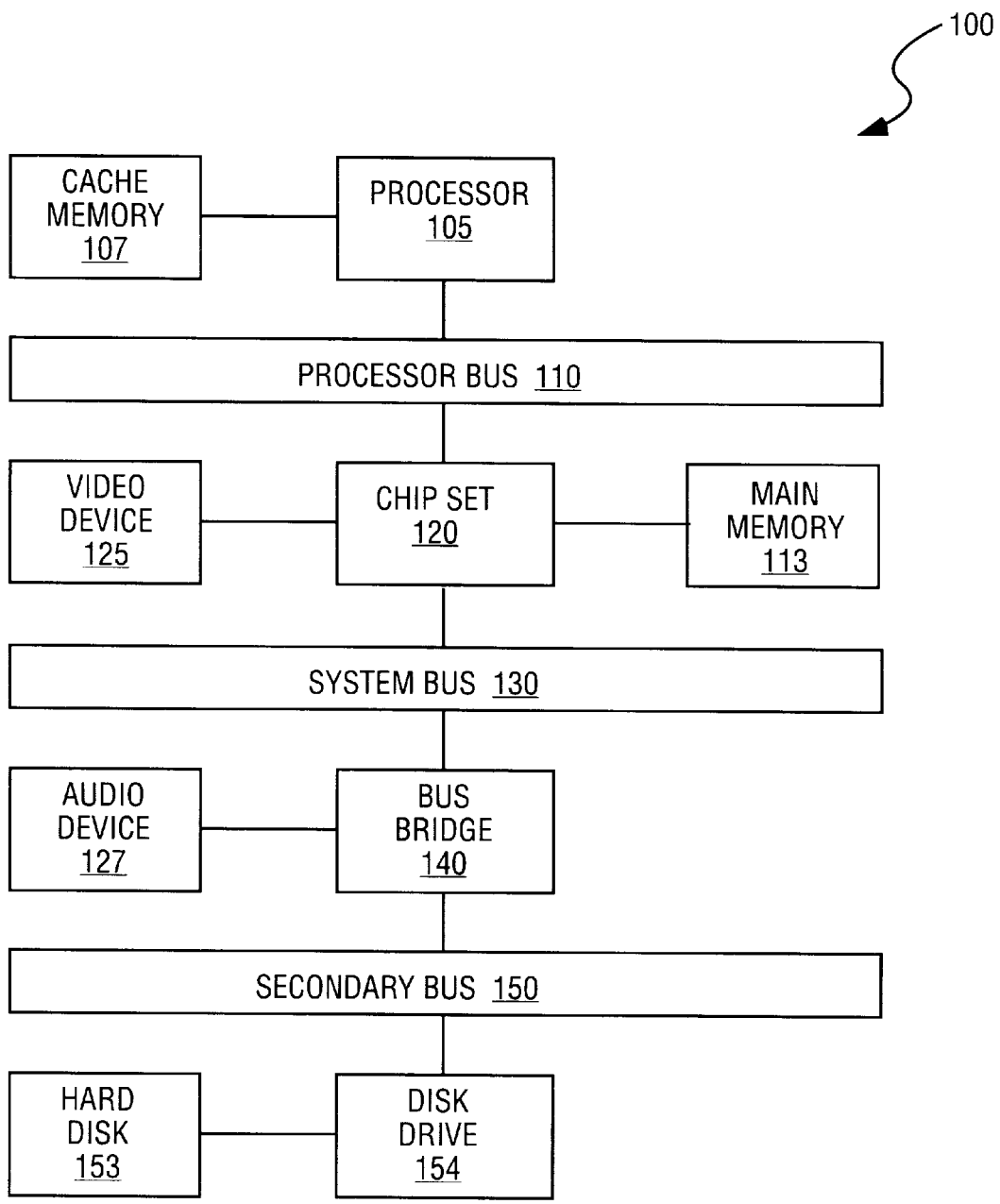
FIG. 1 is a block diagram of one embodiment of a computer system.

FIG. 1 is a block diagram of one embodiment of a computer system 100. Computer system 100 includes a central processing unit (processor) 105 coupled to processor bus 110. In one embodiment, processor 105 is a processor in the Pentium® family of processors including the Pentium® II family and mobile Pentium(® and Pentium® II processors available from Intel Corporation of Santa Clara, Calif. Alternatively, other processors may be used. Processor 105 may include a first level (LI) cache memory (not shown in FIG. 1).

In one embodiment, processor 105 is also coupled to cache memory 107, which is a second level (L2) cache memory, via dedicated cache bus 102. The L1 and L2 cache memories can also be integrated into a single device. Alternatively, cache memory 107 may be coupled to processor 105 by a shared bus. Cache memory 107 is optional and is not required for computer system 100.

Chip set 120 is also coupled to processor bus 110. In one embodiment, chip set 120 is the 440BX chip set available from Intel Corporation; however, other chip sets can also be used. Chip set 120 may include a memory controller for controlling a main memory 113. Main memory 113 is coupled to processor bus 110 through chip set 120. Main memory 113 and cache memory 107 store sequences of instructions that are executed by processor 105. In one embodiment, main memory 113 includes dynamic random access memory (DRAM); however, main memory 113 may have other configurations. The sequences of instructions executed by processor 105 may be retrieved from main memory 113, cache memory 107, or any other storage device. Additional devices may also be coupled to processor bus 110, such as multiple processors and/or multiple main memory devices. Computer system 100 is described in terms of a single processor; however, multiple processors can be coupled to processor bus 110. Video device 125 is also coupled to chip set 120. In one embodiment, video device includes a video monitor such as a cathode ray tube (CRT) or liquid crystal display (LCD) and necessary support circuitry.

Processor bus 110 is coupled to system bus 130 by chip set 120. In one embodiment, system bus 130 is a Peripheral Component Interconnect (PCI) standard bus; however, other bus standards may also be used. Multiple devices, such as audio device 127, may be coupled to system bus 130.

Bus bridge 140 couples system bus 130 to secondary bus 150. In one embodiment, secondary bus 150 is an Industry Standard Architecture (ISA) bus; however, other bus standards may also be used, for example Extended Industry Standard Architecture (EISA). Multiple devices, such as hard disk 153 and disk drive 154 may be coupled to secondary bus 150. Other devices, such as cursor control devices (not shown in FIG. 1), may be coupled to secondary bus 150.

Figure 2:
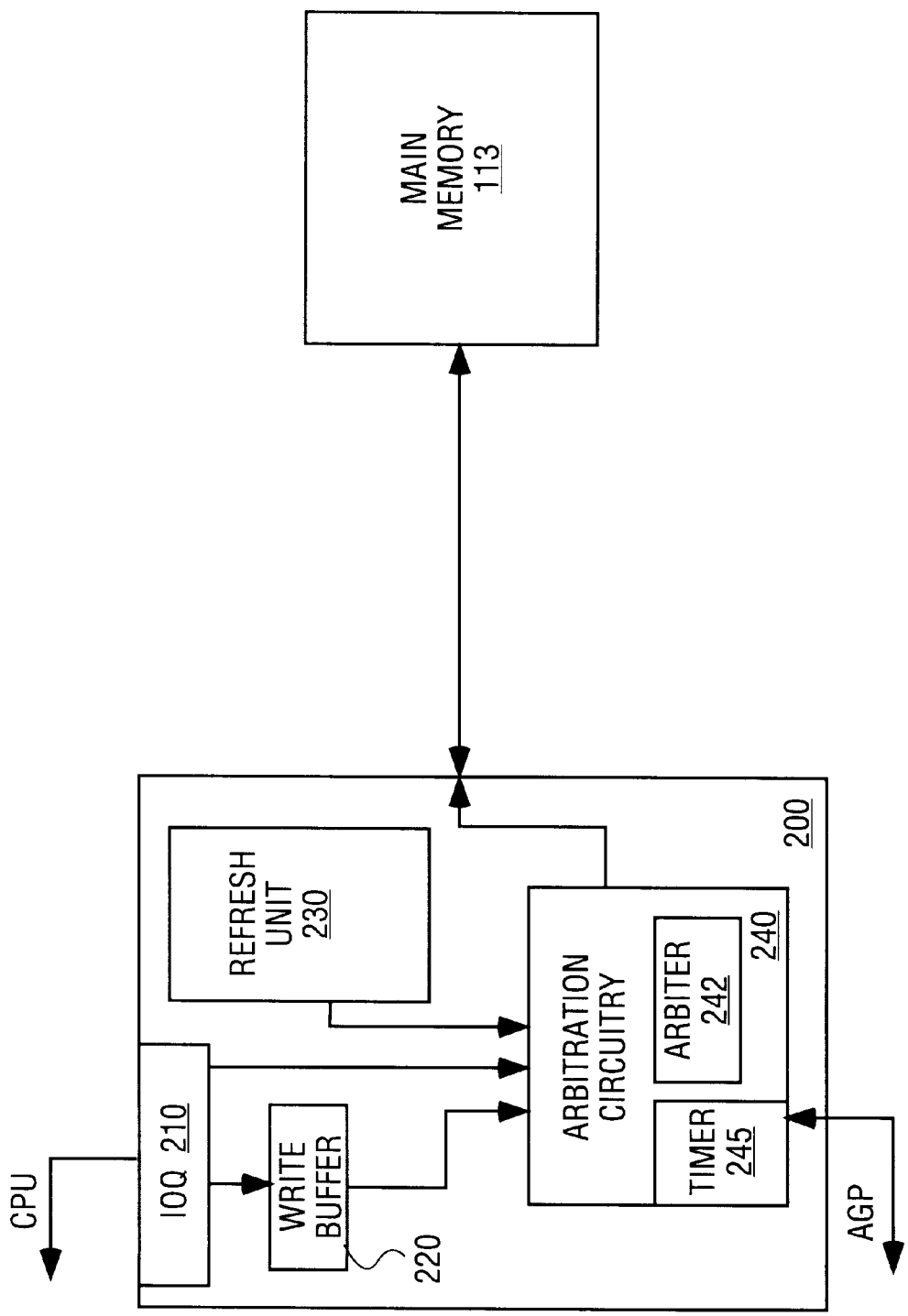
FIG. 2 is a memory controller in accordance with one embodiment of the present invention.

FIG. 2 illustrates a memory controller 200 in accordance with one embodiment of the present invention. Memory controller 200 accesses main memory 113 for memory transactions based upon commands received from processor 110 and one or more peripheral devices coupled to chip set 120, such as video device 125. Memory controller 200 may read data from, and write data to, main memory 113. For some operations such as main memory refresh, memory controller 200 requires access to all portions of main memory 113. For other operations memory controller 200 accesses only a portion of main memory 113. According to one embodiment, memory controller 200 is included within chip set 120.

Memory controller 200 includes an In-Order Queue (IOQ) 210. IOQ 210 buffers information pertaining to main memory 113 access requests from processor 110 or devices on system bus 130. Write buffer 220 is coupled to IOQ 210 and receives requests from IOQ 210 to conduct write transactions at main memory 113. Refresh unit 230 recharges electrical cells within main memory 113 in order to maintain data integrity.

Memory controller 200 also includes arbitration circuitry 240. Arbitration circuitry 240 includes an arbiter 242 that coordinates access to main memory 113 by various agents, such as IOQ 210, write buffer 220 and refresh unit 230. Specifically, arbiter 242 receives access requests from agents, determines the relative priority of the access requests, and then grants access to one of the agents depending upon the relative priorities. Another agent that may be coupled to arbitration circuitry 240 is video device 125. According to one embodiment video device 125 includes an Advanced Graphics Port (AGP). An AGP is an exclusive "video only" bussing system that directly access processor 110 and main memory 113. One of ordinary skill in the art will appreciate that other agents or devices may be coupled to arbitration circuitry 240 in order to gain access to main memory 113.

Arbitration circuitry 240 also includes an idle timer 245. Timer 245 is activated for a predetermined number of clock cycles after IOQ 210 has completed its access to main memory 113. According to one embodiment, timer 245 expires (or times out) four (4) host clock cycles after IOQ 210 has completed its access of main memory 113. In a further embodiment, timer 245 may be programmed to time out after a time interval determined by a system user (e.g., 1–6 host clock cycles). In yet another embodiment, timer 245 may be replaced with a counter that counts a predetermined number host clock cycles after IOQ 210 has completed a memory transaction.

Figure 3:
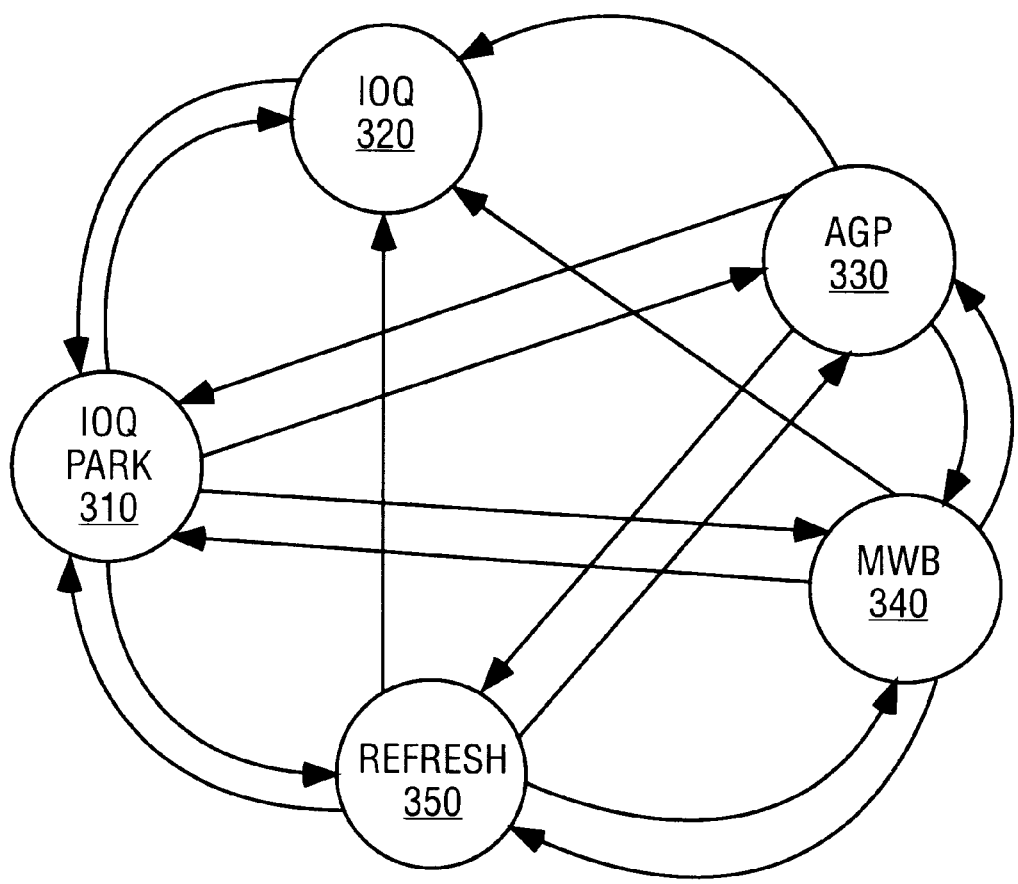
FIG. 3 is a state diagram of an arbiter in accordance with one embodiment of the present invention.

FIG. 3 is a state diagram for arbiter 242. Arbiter 242 includes the following states: IOQ PARK 310, IOQ 320, AGP 330, MWB 340 and REFRESH 350. Arbiter 242 is in IOQ PARK 310 whenever there are no agents requesting access to main memory 113. Arbiter 242 is in IOQ 320, AGP 330, MWB 340 or REFRESH 350 whenever IOQ 210, the AGP, write buffer 220, or refresh unit 230, respectively, are accessing main memory 113. One of ordinary skill in the art will appreciate that additional states could be included in arbiter 242 depending upon the number of agents that must arbitrate for access to main memory 113.

According to one embodiment, arbiter 242 prioritizes access requests as follows, with the number one (1) having the highest priority:

1. A high priority refresh request (REFRESH HIGH).
2. A high priority AGP request (AGP HIGH).
3. A medium priority refresh request (REFRESH MED).
4. An IOQ request (IOQ).
5. A low priority AGP request (AGP LOW).
6. A high priority write request (MWB HIGH).
7. A low priority write request (MWB LOW).
8. A low priority refresh request (REFRESH LOW).

According to a further embodiment, the IOQ, AGP LOW and MWB HIGH request states (i.e., priorities 4–6) are included in a rotating priority group. In such an embodiment, arbitration circuitry 240 includes a grant duration timer for each of the request states in the group. Each grant duration timer limits the maximum duration in which its respective request may have access to main memory 113. If the duration timer expires while one of the rotating requests (e.g., IOQ) has access to main memory 113, the two other rotating requests (e.g., AGP LOW and MWB HIGH) are given priority with respect to subsequent transactions.

Upon startup of computer system 100, arbiter 242 is reset and enters IOQ park 310. Whenever arbiter 242 is in IOQ PARK 310 and receives a request to access main memory 113 by an agent, access is granted to the agent. Thus, arbiter 242 enters into the state of the agent that requested main memory 113. For example, if there is a request to write data to main memory 113 while arbiter 242 is in IOQ PARK 310, arbiter 242 enters into MWB 340 and write buffer 220 is granted access to main memory 113. If more than one agent requests access to main memory 113, the higher priority request is granted access. For instance, if both a REFRESH HIGH and MWB LOW request are received, arbiter 242 enters REFRESH 1330 and refresh unit 230 is granted access to main memory 113.

Whenever main memory 113 has completed servicing a non-IOQ agent (e.g., arbiter 242 is in AGP 330, MWB 340 or REFRESH 350) and other agents request access, arbiter 242 grants access to the highest priority agent in a manner similar to that described above. However, any time IOQ 210 has completed being serviced by main memory 113 (i.e., arbiter in IOQ 320), arbiter 242 first enters IOQ park 310. Timer 245 is activated as arbiter 242 enters IOQ park 310 from IOQ 320. Arbiter 242 remains in IOQ park 310 until timer 245 has been activated for a predetermined number of clock cycles. Thus, non-IOQ agents may not gain access to main memory 113 until timer 245 has timed out. However, IOQ 210 may regain access to main memory 113 while timer 245 is activated.

Since memory traffic generated by IOQ 210 tends to be concentrated in one or more localized regions of main memory 113 over a short period of time, it is likely that a subsequent IOQ request will access the same page of main memory 113 (i.e., a page hit) as a previous IOQ request. Also, a significant fraction of IOQ requests are issued within a predetermined number of clock cycles as a previous IOQ request. Therefore, arbiter 242 waits a predetermined number of clock cycles for a subsequent IOQ request prior to releasing to another agent.

According to another embodiment, arbiter 242 grants access to requests that are higher in priority than IOQ requests before timer 245 has timed out. In such an embodiment, arbiter 242 departs from IOQ park 310 and enters the state of the higher priority request. For example, if arbiter 242 is in IOQ PARK 310, timer 245 is activated and a REFRESH HIGH request is received, arbiter 242 exits IOQ PARK 310 and enters REFRESH 350. As described above, an IOQ grant duration timer limits the maximum duration in which IOQ 210 may have access to main memory 113. IOQ 210 relinquishes control of main memory 113 upon the expiration or timing out of the duration timer. Additionally, the grant duration timer overrides timer 245 and permits arbiter 242 to switch from IOQ 320 to the next requesting state.

FIG. 4 is a flow diagram of the operation of arbiter 242 in accordance with one embodiment of the present invention. At process block 405, arbiter 242 enters IOQ park 310 as computer system 100 is reset. At process block 410, it is determined whether one or more agents have requested access to main memory 113. If no agents have requested access, control remains at process block 410 until an agent requests access. If one or more agents have requested access to main memory 113, access is granted to the highest priority agent, process block 415.

Next, at process block 420, it is determined whether the agent granted access is IOQ 210. If it is determined that the agent granted access is a non-IOQ agent (e.g., refresh unit 230), the agent is serviced by main memory 113, process block 425. Subsequently, control is returned to process block 410 wherein it is determined whether another agent has requested access to main memory 113. If it is determined that the agent granted access is IOQ 210, IOQ 210 is serviced by main memory 113, process block 430. Upon granting access to IOQ 210 arbiter activates the duration timer.

At process block 435, main memory 113 has completed servicing IOQ 210 and timer 245 is activated. At process block 440, arbiter 242 is returned to IOQ PARK 310. At process block 445, it is determined whether one or more high priority agents (i.e., any agent with a priority higher than an IOQ request) have requested access to main memory 113. If it is determined that a high priority agent has requested access to main memory 113 control is returned to process block 415 wherein the high priority requesting agent is granted access.

If no high priority agent requests access to main memory 113 while timer 245 is active, it is determined whether IOQ 210 has requested to regain access to memory 113, process block 455. If IOQ 210 has requested to regain access, control is returned to process block 430 wherein IOQ 210 is again serviced by main memory 113. If IOQ 210 regains access to main memory 113, the IOQ duration timer remains active and is not reset. If IOQ has not requested access to main memory 113, it is determined whether timer 245 has timed out, process block 460.

If timer 245 has not timed out, it is determined whether the duration timer has timed out, process block 465. If the duration timer has not timed out control is returned to process block 445 wherein it is again determined whether a high priority agent has requested access to main memory 113. However, if either timer 245 or the duration timer has timed out, control is returned to process block 410 wherein it is determined whether another agent has requested access to main memory 113.

One of ordinary skill in the art will recognize that process blocks 445–465 may be processed in a variety of different sequences. For example, the process disclosed in process block 455 may be executed before the process in process block 445. Alternatively, process blocks 445–465 may be executed in parallel.

Further, although the present invention has been described with respect to a priority arbitration system, one of ordinary skill in the art will appreciate that the present invention may be implemented using other arbitration systems, such as round robin arbitration. Further, the present invention may be implemented in other electronic systems, such as networks, printers, etc.

Thus an efficient method of selection of an agent by an arbiter in order to gain access to a memory has been described.

What is claimed is:

1. A method of accessing a memory in a computer system, comprising:

granting access of the memory to a first agent after arbitration;

releasing the memory from the control of the first agent;

receiving a request from a second agent during arbitration to access the memory;

determining whether the second agent has a higher priority request classification than the first agent;

if not, determining whether a first predetermined time interval has elapsed since the first agent relinquished control of the memory; and if not, withholding access of the memory to the second agent.

2. The method of claim 1, further comprising granting access of the memory to the second agent if it is determined that the first predetermined time interval has elapsed.

3. The method of claim 1, further comprising:

determining whether the first agent has requested to regain access to the memory if the first predetermined time interval has not elapsed; and granting access of the memory to the first agent.

4. The method of claim 1, further comprising:

activating a timer after granting access to the first agent;

determining whether the timer has been active for a second predetermined time interval;

determining whether the first agent has access to the memory;

terminating the access of the first agent to the memory; and granting access of the memory to the second agent.

5. The method of claim 4, further comprising granting access of the memory to the second agent if the second agent has a higher priority request classification than the first agent.

6. The method of claim 4, wherein the first and second predetermined time intervals are programmable.

7. The method of claim 1, wherein the first agent is a central processing unit (CPU) and the second agent is an Advanced Graphics Port (AGP).

8. A method of reducing access time experienced by a time sensitive device contending for access with a plurality of agents to a resource, the method comprising:

granting access of the resource to a time sensitive device;

activating a first timer after the time sensitive device has completed accessing the resource;

receiving a request from a second of the plurality of devices to access the resource;

determining whether the second device has a higher priority request classification than the time sensitive device; if not determining whether the first timer has expired; and, if not withholding access of the resource to the second device.

9. The method of claim 8, further comprising granting access of the resource to the second device if it is determined that the first timer has expired.

10. The method of claim 8, further comprising:

determining whether the time sensitive device has requested to regain access to the resource if the first timer has not expired; and granting access of the resource to the time sensitive device.

11. The method of claim 8, further comprising:

activating a second timer after granting access to the time sensitive device;

determining whether the second timer has expired;

determining whether the time sensitive device has access to the resource;

terminating the access of the time sensitive device to the resource; and granting access of the resource to the second device.

12. The method of claim 8, further comprising granting access of the resource to the second device if the second device has a higher priority request classification than the time sensitive device.

13. A computer system comprising:

a memory;

a memory controller coupled to the memory to control access to the memory;

a first device coupled to the memory controller; and a second device coupled to the memory controller, wherein the memory controller withholds access to the memory by the second device for a predetermined time interval after the first device has relinquished control of the memory.

14. The computer system of claim 13, wherein the memory controller grants access of the memory to the first device during the predetermined time interval upon receiving an access request from the first device.

15. The computer system of claim 13, wherein the memory controller grants access of the memory to the second device after the predetermined time interval.

16. The computer system of claim 13, further comprising a third device coupled to the memory controller wherein the memory controller grants access of the memory to the third device during the predetermined time interval.

17. The computer system of claim 13, wherein the memory controller further comprises arbitration circuitry.

18. The computer system of claim 17, wherein the arbitration circuitry comprises:

an arbiter for controlling access to the memory; and a timer.

19. The computer system of claim 16, wherein the first device is an in order queue, the second device is a write buffer and the third device is a refresh unit.

20. A memory controller comprising:

an arbiter adaptable to control access to a memory wherein the access is controlled by withholding access to the memory by a second device for a predetermined time interval after a first device has relinquished control of the memory.

21. The memory controller of claim 20, further comprising a timer, wherein the timer determines the predetermined time interval.

22. The memory controller of claim 20, further comprising a counter, wherein the counter determines determines the predetermined time interval.

23. The memory controller of claim 20, wherein the arbiter is adaptable to grant access of the memory to the first device during the predetermined time interval upon receiving an access request from the first device.

24. The memory controller of claim 20, wherein the arbiter is adaptable to grant access of the memory to the second device after the predetermined time interval.

25. The memory controller of claim 20, wherein the arbiter is adaptable to grant access of the memory to a third device during the predetermined time interval.

26. An arbitration circuit comprising:

an arbiter adaptable to control access to a resource wherein access is controlled by withholding access to the resource by a second agent for a predetermined time interval after a first agent has relinquished control of the resource.

27. The arbitration circuit of claim 26, further comprising a timer, wherein the timer determines the predetermined time interval.

28. The arbitration circuit of claim 26, wherein the arbiter is adaptable to grant access of the resource to the first agent during the predetermined time interval upon receiving an access request from the first agent.

29. The arbitration circuit of claim 26, wherein the arbiter is adaptable to grant access of the resource to the second agent after the predetermined time interval.

30. The arbitration circuit of claim 26, wherein the arbiter is adaptable to grant access of the resource to a third agent during the predetermined time interval.

* * * * *

UNITED STATES PATENT AND TRADEMARK OFFICE
CERTIFICATE OF CORRECTION

PATENT NO. : 6,215,703 B1　　　　　　　　　　　　　　　　　　　　　　　Page 1 of 1
DATED : April 10, 2001
INVENTOR(S) : Bogin et al.

It is certified that error appears in the above-identified patent and that said Letters Patent is hereby corrected as shown below:

Drawings,
Sheet 3 of 4, Fig. 3, above the drawing of Figure 3, insert the arbiter designation -- 242 --.

Column 4,
Line 33, delete "REFRESH 1330" and insert -- REFRESH 330 --.

Signed and Sealed this

Twentieth Day of August, 2002

Attest:

Attesting Officer

JAMES E. ROGAN
Director of the United States Patent and Trademark Office